US010044314B1

United States Patent
Yen

(10) Patent No.: US 10,044,314 B1
(45) Date of Patent: Aug. 7, 2018

(54) MOTOR APPARATUS AND MOTOR DRIVING CIRCUIT

(71) Applicant: FAIRWAY ELECTRONIC CO., LTD., New Taipei (TW)

(72) Inventor: Lin-Han Yen, New Taipei (TW)

(73) Assignee: FAIRWAY ELECTRONIC CO., LTD., New Taipei (TW)

( * ) Notice: Subject to any disclaimer, the term of this patent is extended or adjusted under 35 U.S.C. 154(b) by 0 days.

(21) Appl. No.: 15/820,464

(22) Filed: Nov. 22, 2017

(30) Foreign Application Priority Data

Jul. 20, 2017 (TW) .............................. 106124332 A

(51) Int. Cl.
*H02H 7/08* (2006.01)
*H02P 29/02* (2016.01)
*H02P 6/14* (2016.01)
*H02P 1/12* (2006.01)
*H02P 31/00* (2006.01)
*H02K 5/10* (2006.01)
*H02P 29/68* (2016.01)

(52) U.S. Cl.
CPC .............. *H02P 29/02* (2013.01); *H02K 5/10* (2013.01); *H02P 1/12* (2013.01); *H02P 6/14* (2013.01); *H02P 29/68* (2016.02); *H02P 31/00* (2013.01)

(58) Field of Classification Search
CPC ................................ H02P 29/02; H02P 29/68
USPC ....................................................... 318/400.21
See application file for complete search history.

(56) References Cited

U.S. PATENT DOCUMENTS

| 9,698,722 | B2 * | 7/2017 | Loken ..................... H02P 29/68 |
| 2017/0125657 | A1 * | 5/2017 | Kaibe ..................... H01L 35/10 |
| 2018/0076736 | A1 * | 3/2018 | Lu ......................... H02M 7/5387 |

* cited by examiner

*Primary Examiner* — Erick Glass
(74) *Attorney, Agent, or Firm* — JCIPRNET

(57) ABSTRACT

A motor apparatus and a motor driving circuit are provided. The motor apparatus includes a motor module and the motor driving circuit. The motor driving circuit includes a plurality of bridge arm circuits, a temperature sensor, and a control circuit. Each of the bridge arm circuits is controlled by one of the first PWM signals and one of the second PWM signals generated by the control circuit and outputs a driving signal to drive the motor module. The temperature sensor senses a temperature of the bridge arm circuits and provides a temperature sensing value to the control circuit. When the temperature sensing value is greater than or equal to a threshold temperature value, the control circuit increases a duty cycle of the first PWM signal of one bridge arm circuit and a duty cycle of the second PWM signal of the other bridge arm circuits to lower the temperature.

15 Claims, 10 Drawing Sheets

MOTOR APPARATUS AND MOTOR DRIVING CIRCUIT

CROSS-REFERENCE TO RELATED APPLICATION

This application claims the priority benefit of Taiwan application serial no. 106124332, filed on Jul. 20, 2017. The entirety of the above-mentioned patent application is hereby incorporated by reference herein and made a part of this specification.

BACKGROUND OF THE INVENTION

Field of the Invention

The invention relates to motor technology and more particularly relates to a high performance motor apparatus and a motor driving circuit.

Description of Related Art

The existing motor driving technology usually utilizes the pulse width modulation (PWM) control technique to control the power switch element in the motor driving circuit for the power switch element to provide a driving signal (e.g., a current) to control the operating speed of the motor. However, when the power switch element is turned on or turned off in responds to transition of the pulse width modulation signal, frequently turning on and off the power switch element would result in switching power loss and raise the temperature of the power switch element. When the temperature of the power switch element is too high, the power switch element may be stopped for cooling, but it will interrupt the operation of the motor. Another common technique is to use a heat dissipation device for cooling the power switch element, but it will increase the production costs of the motor and such a technique is not suitable for a miniaturized motor apparatus.

Moreover, the existing motor apparatus is usually provided with a start-up switch and a speed adjustment switch. The user may start up or shut down the motor apparatus through the start-up switch, and manually adjust the operating speed of the motor apparatus through the speed adjustment switch. Generally, the aforementioned start-up switch and speed adjustment switch are contact type switches, such as a mechanical switch or a micro switch. However, when the motor apparatus vibrates due to operation, the contact electrodes in such contact type switches may be in poor contact due to the vibration, which may even cause a spark and cause the contact electrodes to be oxidized. In addition, the motor apparatus with such contact type switches is generally inferior in terms of waterproof function, which also limits use of the motor apparatus.

Furthermore, the general motor driving circuit has an over-current protection mechanism for protecting the motor when the current value of the motor exceeds a preset current value. Since the motor has a larger current at the time of start-up, if the preset current value is set too low, the over-current protection mechanism may be triggered frequently during the start-up and cause the start-up time of the motor to become longer. On the other hand, if the preset current value is set too high, it may shorten the start-up time, but the risk of providing an excessive current to the motor also increases.

SUMMARY OF THE INVENTION

In view of the above, the invention provides a motor apparatus and a motor driving circuit, so as to solve the problem described in the related art.

The motor apparatus of the invention includes a motor module and a motor driving circuit, wherein the motor module includes a plurality of stator coils. Furthermore, the motor driving circuit of the invention includes a plurality of bridge arm circuits, a temperature sensor, and a control circuit. The bridge arm circuits are coupled to the stator coils to sequentially drive the motor module. Each of the bridge arm circuits receives a first pulse width modulation signal and a second pulse width modulation signal and is controlled by the first pulse width modulation signal and the second pulse width modulation signal to output a driving signal to drive the motor module. The temperature sensor is configured to sense a temperature of the bridge arm circuits and generate a temperature sensing value accordingly. The control circuit is coupled to the bridge arm circuits to generate the first pulse width modulation signal and the second pulse width modulation signal for each of the bridge arm circuits. The control circuit is further coupled to the temperature sensor to receive the temperature sensing value and compares the temperature sensing value with a threshold temperature value. When the control circuit determines that the temperature sensing value is greater than or equal to the threshold temperature value, the control circuit increases a duty cycle of the first pulse width modulation signal of a driving bridge arm circuit among the bridge arm circuits to reduce the number of times of transition of the first pulse width modulation signal of the driving bridge arm circuit, and the control circuit increases a duty cycle of the second pulse width modulation signal of other bridge arm circuits among the bridge arm circuits to reduce the number of times of transition of the second pulse width modulation signal of the other bridge arm circuits, so as to lower the temperature of the bridge arm circuits.

In an embodiment of the invention, the motor apparatus further includes a first magnetic element and a first magnetic field sensing element. The first magnetic element is configured to generate a first magnetic field. The first magnetic field sensing element is coupled to the control circuit. When the first magnetic element is moved close to or away from the first magnetic field sensing element, the first magnetic field sensing element senses a change of an intensity of the first magnetic field and generates a first sensing signal accordingly. The control circuit adjusts a rotational speed of the motor module correspondingly according to the first sensing signal.

In an embodiment of the invention, the motor apparatus further includes a second magnetic element and a second magnetic field sensing element. The second magnetic element is configured to generate a second magnetic field. The second magnetic field sensing element is coupled to the control circuit. When the second magnetic element is moved close to the second magnetic field sensing element, the second magnetic field sensing element senses the second magnetic field and generates a second sensing signal accordingly. When the control circuit detects that the second magnetic element is moved according to the second sensing signal, the control circuit controls a current rotational speed range of the motor module to switch from a set rotational speed range to another set rotational speed range.

In an embodiment of the invention, the motor apparatus further includes a current detection circuit, a first over-current protection circuit, and a second over-current protection circuit. The current detection circuit is coupled to the bridge arm circuits and configured to detect a current value of the motor module and generate a current sensing signal accordingly. The first over-current protection circuit is coupled to the current detection circuit to receive the current sensing signal and compare the current value indicated by the current sensing signal with a first reference value, so as to generate a first over-current protection signal. The second over-current protection circuit is coupled to the current detection circuit to receive the current sensing signal and compare the current value indicated by the current sensing signal with a second reference value, so as to generate a second over-current protection signal, wherein the second reference value is smaller than the first reference value. The control circuit is further coupled to the first over-current protection circuit and the second over-current protection circuit to receive the first over-current protection signal and the second over-current protection signal respectively. The control circuit performs an over-current protection on the motor module according to the first over-current protection signal in a start-up stage of the motor module, and the control circuit performs the over-current protection on the motor module according to the second over-current protection signal when the start-up stage of the motor module has been completed.

Based on the above, in the motor apparatus and the motor driving circuit of the invention, the operating speed of the motor module is increased when the temperature of the bridge arm circuits is greater than or equal to the threshold temperature value, so as to reduce the number of times of turning on and off the transistors in the bridge arm circuits to reduce switching power loss of the transistors and thereby lower the temperature of the bridge arm circuits. Furthermore, the motor apparatus and the motor driving circuit disclosed in the embodiments of the invention use a non-contact type magnetic force sensing switch as the speed adjustment switch of the motor apparatus. Thus, when the motor apparatus vibrates due to operation, the non-contact type magnetic force sensing switch does not cause a spark due to the vibration, and therefore the motor apparatus has a longer service life and better waterproof and dustproof functions than a general motor apparatus with a contact type switch. Besides, the motor driving circuit performs the over-current protection with the larger first reference value in the start-up stage of the motor module, so as to avoid frequently triggering the over-current protection mechanism during start-up of the motor module, which results in longer time for start-up of the motor module. On the other hand, in the normal operation stage after the motor module has completed the start-up, the motor driving circuit performs the over-current protection with the smaller second reference value, so as to prevent the motor module from being damaged by an excessive current during the normal operation.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
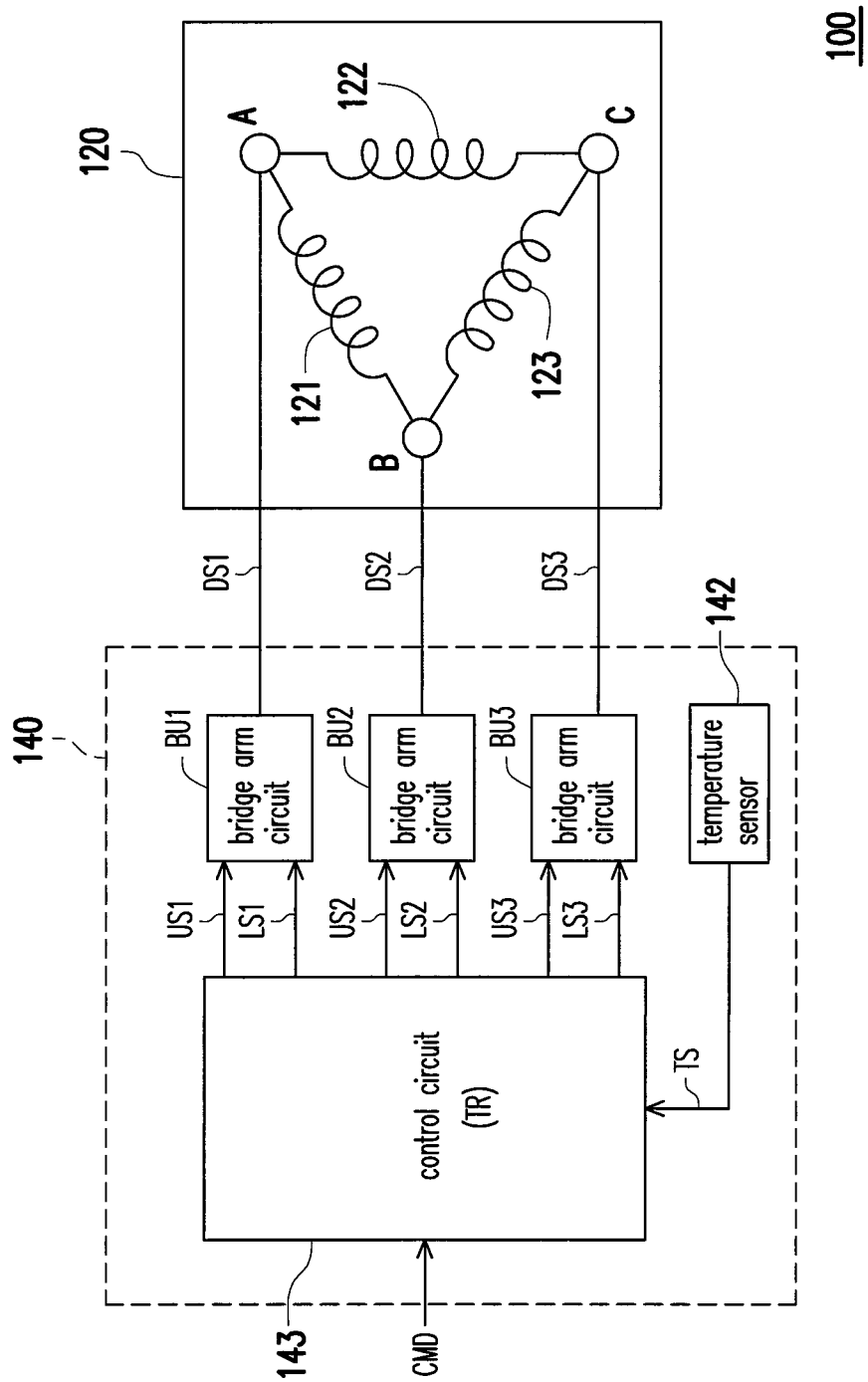
FIG. 1 is a circuit block diagram of the motor apparatus according to an embodiment of the invention.

In order to make the invention more comprehensible, several embodiments are described below as examples of implementation of the invention. Moreover, elements/components/steps with the same reference numerals are used to represent identical or similar parts in the figures and embodiments where appropriate.

The motor apparatuses provided in the following embodiments of the invention may be used in electrical products, such as a grinding machine, a hair dryer, a range hood, a vacuum cleaner, a fan, and so on, but not limited thereto. Hereinafter, referring to FIG. 1, FIG. 1 is a circuit block diagram of a motor apparatus 100 according to an embodiment of the invention. The motor apparatus 100 may include a motor module 120 and a motor driving circuit 140, wherein the motor module 120 may be a multiphase AC motor module. Nevertheless, the invention is not intended to limit the number of phases of the motor module 120. For convenience of explanation, the following embodiments are described based on an example where the motor module 120 is a three-phase AC motor module. Embodiments where the number of phases of the motor module 120 is 2 or greater than 3 may be inferred from the following descriptions.

Accordingly, the motor module 120 may include three stator coils 121, 122, and 123, wherein the stator coils 121, 122, and 123 are coupled to one another to form a triangular coil structure. Moreover, the motor driving circuit 140 includes three bridge arm circuits BU1, BU2, and BU3, a temperature sensor 142, and a control circuit 143, but the invention is not limited thereto.

The bridge arm circuits BU1, BU2, and BU3 are coupled to the stator coils 121, 122, and 123 to sequentially drive the motor module 120 and enable the motor module 120 to operate. More specifically, the bridge arm circuit BU1 is coupled to a phase node A between the stator coil 121 and the stator coil 122, the bridge arm circuit BU2 is coupled to a phase node B between the stator coil 121 and the stator coil 123, and the bridge arm circuit BU3 is coupled to a phase node C between the stator coil 122 and the stator coil 123.

In terms of operation, the bridge arm circuit BU1 receives a first pulse width modulation signal US1 and a second pulse width modulation signal LS1, and is controlled by the first pulse width modulation signal US1 and the second pulse width modulation signal LS1 to output a driving signal DS1 to drive the motor module 120. The bridge arm circuit BU2 receives a first pulse width modulation signal US2 and a second pulse width modulation signal LS2, and is controlled by the first pulse width modulation signal US2 and the second pulse width modulation signal LS2 to output a driving signal DS2 to drive the motor module 120. Likewise, the bridge arm circuit BU3 receives a first pulse width modulation signal US3 and a second pulse width modulation signal LS3, and is controlled by the first pulse width modulation signal US3 and the second pulse width modulation signal LS3 to output a driving signal DS3 to drive the motor module 120. Details will be provided later.

The temperature sensor 142 is configured to sense a temperature of the bridge arm circuits BU1, BU2, and BU3 and generate a temperature sensing value TS accordingly. In an embodiment of the invention, the temperature sensor 142 may be implemented by using a thermistor with a negative temperature coefficient, but the invention is not limited thereto. Moreover, in an embodiment of the invention, the temperature sensor 142 may also be integrated into the control circuit 143.

The control circuit 143 is coupled to the bridge arm circuits BU1, BU2, and BU3. In a normal operation, the control circuit 143 may receive a command signal CMD and generate the first pulse width modulation signals US1, US2, and US3 and the second pulse width modulation signals LS1, LS2, and LS3 according to the command signal CMD to control the bridge arm circuits BU1, BU2, and BU3, so as to achieve control over a rotational speed of the motor module 120.

In addition, the control circuit 143 is further coupled to the temperature sensor 142 to receive the temperature sensing value TS. The control circuit 143 may compare the temperature sensing value TS with a threshold temperature value TR. In particular, when the control circuit 143 determines that the temperature sensing value TS is greater than or equal to the threshold temperature value TR, the control circuit 143 increases a duty cycle of the first pulse width modulation signal of a driving bridge arm circuit among the bridge arm circuits BU1, BU2, and BU3 to reduce the number of times of transition of the first pulse width modulation signal of the driving bridge arm circuit, and the control circuit 143 increases a duty cycle of the second pulse width modulation signal of other bridge arm circuits among the bridge arm circuits BU1, BU2, and BU3 to reduce the number of times of transition of the second pulse width modulation signals of the other bridge arm circuits, so as to lower the temperature of the bridge arm circuits BU1, BU2, and BU3.

For example, in a case where the bridge arm circuit BU1 is the driving bridge arm circuit and provides the driving signal DS1 to drive the motor module 120, when the temperature sensing value TS is greater than or equal to the threshold temperature value TR, the control circuit 143 increases the duty cycle of the first pulse width modulation signal US1 to reduce the number of times of transition of the first pulse width modulation signal US1 of the bridge arm circuit BU1, and the control circuit 143 increases the duty cycle of the second pulse width modulation signal LS2 and the duty cycle of the second pulse width modulation signal LS3 to reduce the numbers of times of transition of the second pulse width modulation signals LS2 and LS3. Accordingly, switching power loss caused by frequently turning on and off the transistors in the bridge arm circuits BU1, BU2, and BU3 may be reduced to lower the temperature of the bridge arm circuits BU1, BU2, and BU3.

In an embodiment of the invention, the control circuit 143 may be hardware, firmware, software stored in a memory to be loaded and executed by a micro-processor, a micro-controller or a digital signal processor (DSP), or a machine-executable code. If the control circuit 143 is implemented by using hardware, the control circuit 143 may be realized by a single integrated circuit chip or a plurality of circuit chips, but the invention is not limited thereto. The plurality of circuit chips or the single integrated circuit chip may be implemented by using an application-specific integrated circuit (ASIC) or a field-programmable gate array (FPGA). The memory may be a random access memory, a read-only memory, a flash memory, a hard disk, or a disc, for example.

Figure 2:
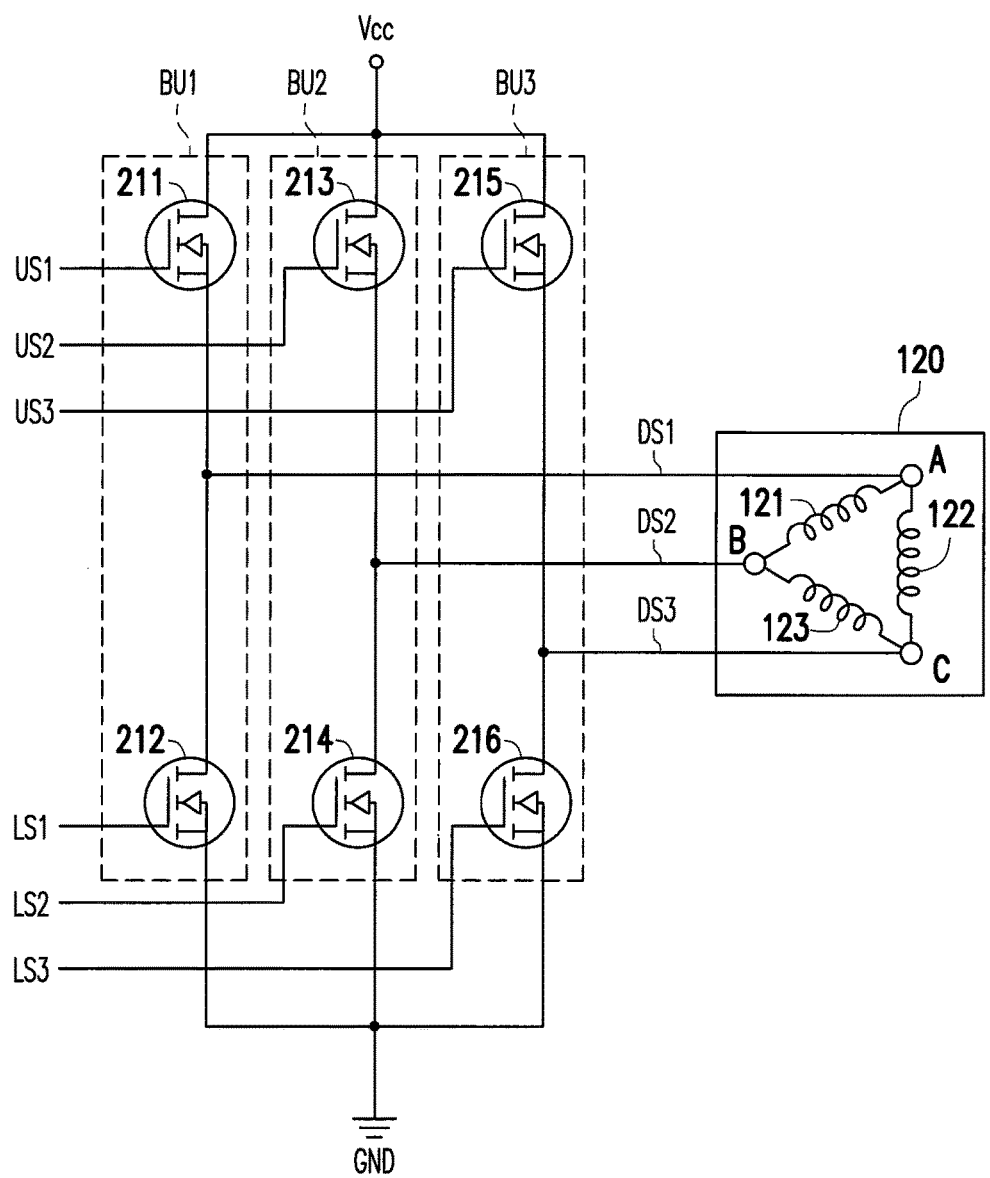
FIG. 2 is a diagram showing circuit configurations of the bridge arm circuits and how they are coupled to the motor module according to an embodiment of the invention.

Hereinafter, referring to FIG. 1 and FIG. 2, FIG. 2 is a diagram showing circuit configurations of the bridge arm circuits BU1, BU2, and BU3 and how they are coupled to the motor module 120 according to an embodiment of the invention. The bridge arm circuit BU1 includes an upper arm transistor 211 and a lower arm transistor 212. The drain end of the upper arm transistor 211 is coupled to a power supply end VCC. The gate end of the upper arm transistor 211 receives the first pulse width modulation signal US1. The source end of the upper arm transistor 211 is coupled to the drain end of the lower arm transistor 212 and coupled to the phase node A between the stator coil 121 and the stator coil 122. The gate end of the lower arm transistor 212 receives the second pulse width modulation signal LS1. The source end of the lower arm transistor 212 is coupled to a ground end GND.

Moreover, the bridge arm circuit BU2 includes an upper arm transistor 213 and a lower arm transistor 214. The drain end of the upper arm transistor 213 is coupled to the power supply end VCC. The gate end of the upper arm transistor 213 receives the first pulse width modulation signal US2. The source end of the upper arm transistor 213 is coupled to the drain end of the lower arm transistor 214 and coupled to the phase node B between the stator coil 121 and the stator coil 123. The gate end of the lower arm transistor 214 receives the second pulse width modulation signal LS2. The source end of the lower arm transistor 214 is coupled to the ground end GND. Likewise, the bridge arm circuit BU3 includes an upper arm transistor 215 and a lower arm transistor 216. The drain end of the upper arm transistor 215 is coupled to the power supply end VCC. The gate end of the upper arm transistor 215 receives the first pulse width modulation signal US3. The source end of the upper arm transistor 215 is coupled to the drain end of the lower arm transistor 216 and coupled to the phase node C between the stator coil 122 and the stator coil 123. The gate end of the lower arm transistor 216 receives the second pulse width modulation signal LS3. The source end of the lower arm transistor 216 is coupled to the ground end GND.

Figure 3:
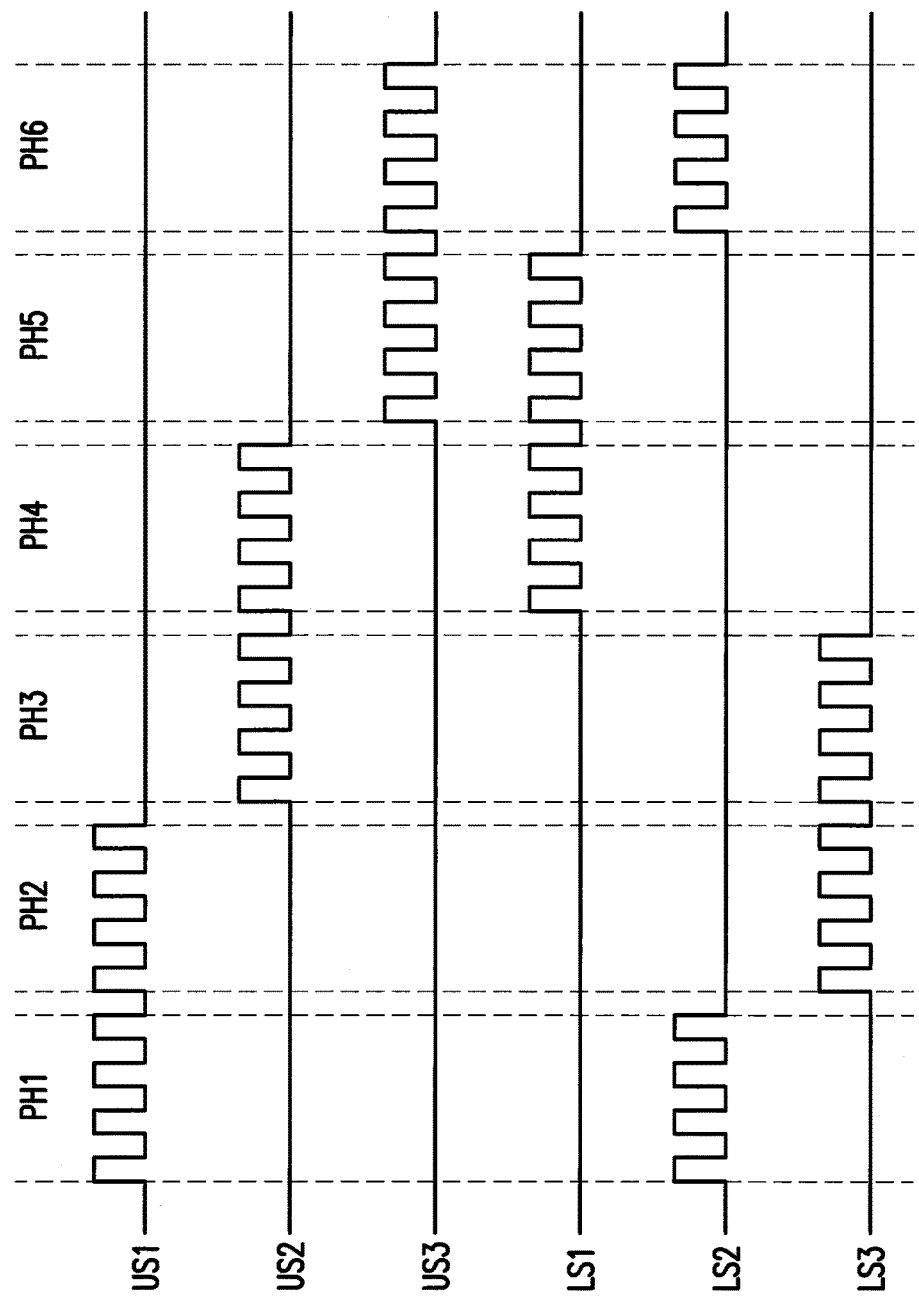
FIG. 3 is a waveform diagram of the first pulse width modulation signals and the second pulse width modulation signals under the normal operation of the motor apparatus according to an embodiment of the invention.

Hereinafter, referring to FIG. 1 through FIG. 3, FIG. 3 is a waveform diagram of the first pulse width modulation signals US1, US2, and US3 and the second pulse width modulation signals LS1, LS2, and LS3 under the normal operation of the motor apparatus 100 according to an embodiment of the invention. When the temperature sensing value TS is smaller than the threshold temperature value TR, the control circuit 143 may generate the first pulse width modulation signals US1, US2, and US3 and the second pulse width modulation signals LS1, LS2, and LS3, as shown in FIG. 3 for example (but not limited thereto), according to the command signal CMD to control the rotational speed of the motor module 120.

More specifically, in a first phase stage PH1, the bridge arm circuit BU1 is the driving bridge arm circuit, and the upper arm transistor 211 in the bridge arm circuit BU1 may be turned on in response to the first pulse width modulation signal US1 at a logic high level and be turned off in response to the first pulse width modulation signal US1 at a logic low level. In addition, the lower arm transistor 214 in the bridge arm circuit BU2 may be turned on in response to the second pulse width modulation signal LS2 at the logic high level and be turned off in response to the second pulse width modulation signal LS2 at the logic low level. The duty cycles of the first pulse width modulation signal US1 and the second pulse width modulation signal LS2 are both 50%, but not limited thereto. The duty cycles of the first pulse width modulation signal US1 and the second pulse width modulation signal LS2 may be determined according to the command signal CMD. Furthermore, the lower arm transistor 212 in the bridge arm circuit BU1, the upper arm transistor 213 in the bridge arm circuit BU2, and the upper arm transistor 215 and the lower arm transistor 216 in the bridge arm circuit BU3 may be turned off respectively in response to the second pulse width modulation signal LS1, the first pulse width modulation signal US2, the first pulse width modulation signal US3, and the second pulse width modulation signal LS3 that are all at the logic low level. Accordingly, in the first phase stage PH1, by turning on the upper arm transistor 211 and the lower arm transistor 214, the bridge arm circuit BU1 may provide the driving signal DS1 (e.g., a driving current) to the motor module 120.

When the first phase stage PH1 has been completed, the control circuit 143 performs a phase changing operation and enters a second phase stage PH2 after a time interval. The only difference between the second phase stage PH2 and the first phase stage PH1 is that: in the second phase stage PH2, the lower arm transistor 214 in the bridge arm circuit BU2 is turned off in response to the second pulse width modulation signal LS2 at the logic low level, and the lower arm transistor 216 in the bridge arm circuit BU3 may be turned on in response to the second pulse width modulation signal LS3 at the logic high level and be turned off in response to the second pulse width modulation signal LS3 at the logic low level. Therefore, in the second phase stage PH2, by turning on the upper arm transistor 211 and the lower arm transistor 216, the bridge arm circuit BU1 may provide the driving signal DS1 (e.g., driving current) to the motor module 120.

When the second phase stage PH2 has been completed, the control circuit 143 performs the phase changing operation and enters a third phase stage PH3 after a time interval. The only difference between the third phase stage PH3 and the second phase stage PH2 is that: in the third phase stage PH3, the bridge arm circuit BU2 is the driving bridge arm circuit, and the upper arm transistor 213 in the bridge arm circuit BU2 may be turned on in response to the first pulse width modulation signal US2 at the logic high level and be turned off in response to the first pulse width modulation signal US2 at the logic low level; and the upper arm transistor 211 in the bridge arm circuit BU1 may be turned off in response to the first pulse width modulation signal US1 at the logic low level. Therefore, in the third phase stage PH3, by turning on the upper arm transistor 213 and the lower arm transistor 216, the bridge arm circuit BU2 may provide the driving signal DS2 (e.g., driving current) to the motor module 120.

When the third phase stage PH3 has been completed, the control circuit 143 performs the phase changing operation and enters a fourth phase stage PH4 after a time interval. The only difference between the fourth phase stage PH4 and the third phase stage PH3 is that: in the fourth phase stage PH4, the lower arm transistor 216 in the bridge arm circuit BU3 is turned off in response to the second pulse width modulation signal LS3 at the logic low level, and the lower arm transistor 212 in the bridge arm circuit BU1 may be turned on in response to the second pulse width modulation signal LS1 at the logic high level and be turned off in response to the second pulse width modulation signal LS1 at the logic low level. Therefore, in the fourth phase stage PH4, by turning on the upper arm transistor 213 and the lower arm transistor 212, the bridge arm circuit BU2 may provide the driving signal DS2 (e.g., driving current) to the motor module 120.

Likewise, when the fourth phase stage PH4 has been completed, the control circuit 143 performs the phase changing operation and enters a fifth phase stage PH5 after a time interval. In the fifth phase stage PH5, the bridge arm circuit BU3 is the driving bridge arm circuit. The operations in the fifth phase stage PH5 and the subsequent sixth phase stage PH6 may be inferred from the descriptions of the first phase stage PH1 through the fourth phase stage PH4 with reference to FIG. 3 and thus are not repeated hereinafter. When the sixth phase stage PH6 has been completed, the control circuit 143 performs the phase changing operation again and operates cyclically in the first phase stage PH1 through the sixth phase stage PH6.

Figure 4:
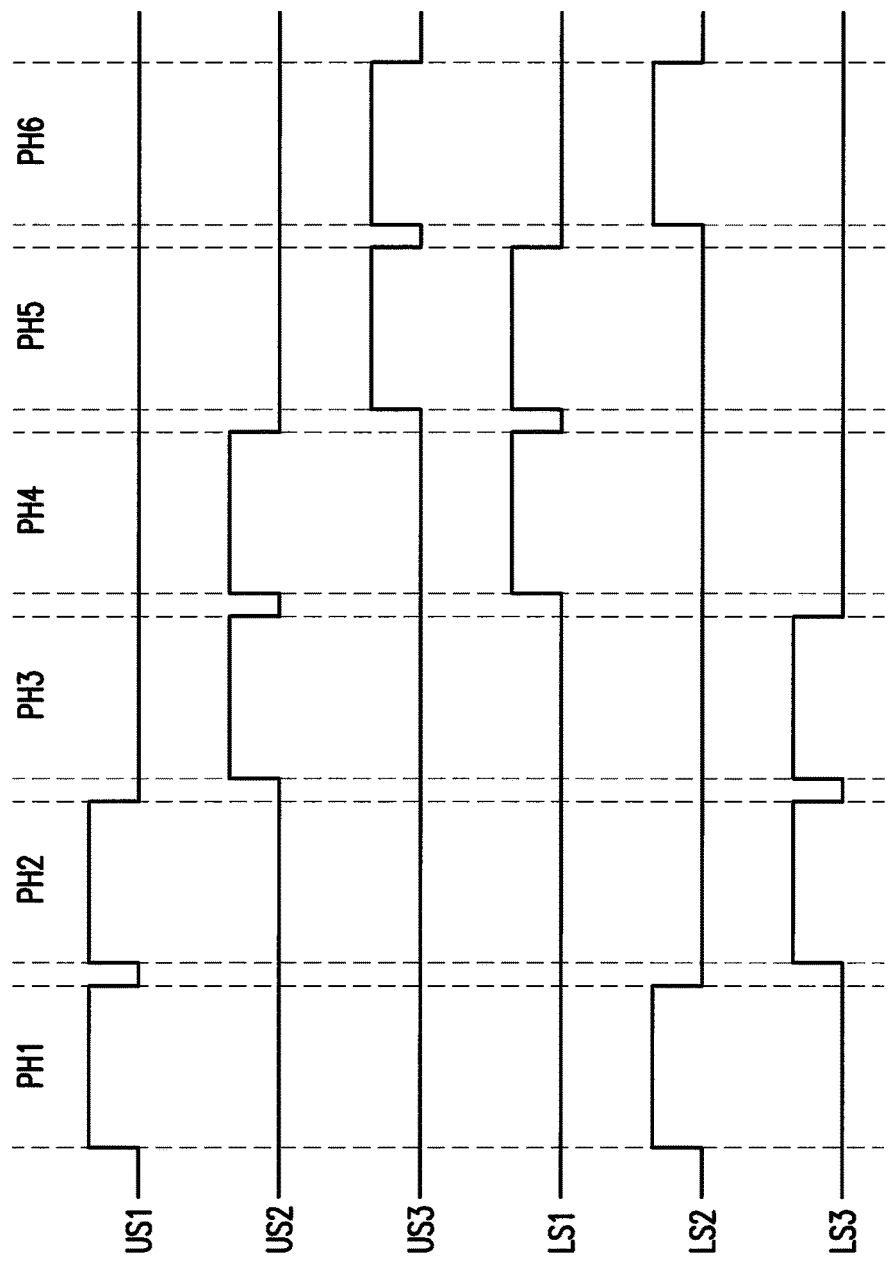
FIG. 4 is a waveform diagram of the first pulse width modulation signals and the second pulse width modulation signals when the temperature-lowering operation is performed on the bridge arm circuits according to an embodiment of the invention.

When the temperature sensing value TS is greater than or equal to the threshold temperature value TR, in the first phase stage PH1 described above, the control circuit 143 may increase the duty cycles of the first pulse width modulation signal US1 and the second pulse width modulation signal LS2 to increase the rotational speed of the motor module 120, so as to reduce the numbers of times of transition of the first pulse width modulation signal US1 and the second pulse width modulation signal LS2. The number of times of transition described above refers to a sum of the number of times of transition of the pulse width modulation signal from the logic low level to the logic high level and the number of times of transition from the logic high level to the logic low level. For example, in the first phase stage PH1, the numbers of times of transition of the first pulse width modulation signal US1 and the second pulse width modulation signal LS2 are both 8. Thus, in order to reduce the temperature of the bridge arm circuits BU1 and BU2, the control circuit 143 may raise the duty cycles of the first pulse width modulation signal US1 and the second pulse width modulation signal LS2 from 50% as shown in FIG. 3 to 100% as shown in FIG. 4, so as to enable the motor module 120 to operate at the maximum rotational speed. Accordingly, the numbers of times of transition of the first pulse width modulation signal US1 and the second pulse width modulation signal LS2 are both reduced from 8 as shown in FIGS. 3 to 2 as shown in FIG. 4. By decreasing the number of times of turning on and off the upper arm transistor 211 and the lower arm transistor 214 to reduce the switching power loss, the purpose of lowering the temperature of the bridge arm circuits BU1 and BU2 is achieved for the motor module 120 to maintain the operation.

Likewise, when the temperature sensing value TS is greater than or equal to the threshold temperature value TR, in the second phase stage PH2 described above, the control circuit 143 may increase the duty cycles of the first pulse width modulation signal US1 and the second pulse width modulation signal LS3 to increase the rotational speed of the motor module 120, so as to reduce the numbers of times of transition of the first pulse width modulation signal US1 and the second pulse width modulation signal LS3. For example, in order to reduce the temperature of the bridge arm circuits BU1 and BU3, the control circuit 143 may raise the duty cycles of the first pulse width modulation signal US1 and the second pulse width modulation signal LS3 from 50% as shown in FIG. 3 to 100% as shown in FIG. 4, so as to enable the motor module 120 to operate at the maximum rotational speed. Accordingly, the numbers of times of transition of the first pulse width modulation signal US1 and the second pulse width modulation signal LS3 are both reduced from 8 as shown in FIGS. 3 to 2 as shown in FIG. 4. By decreasing the number of times of turning on and off the upper arm transistor 211 and the lower arm transistor 216 to reduce the switching power loss, the purpose of lowering the temperature of the bridge arm circuits BU1 and BU3 is achieved.

The operations in the third phase stage PH3 through the sixth phase stage PH6 of FIG. 4 may be inferred from the descriptions of the first phase stage PH1 and the second phase stage PH2 with reference to FIG. 4 and thus are not repeated hereinafter. Moreover, when the temperature sensing value TS is smaller than the threshold temperature value TR, the control circuit 143 may correspondingly generate the first pulse width modulation signals US1, US2, and US3 and the second pulse width modulation signals LS1, LS2, and LS3 according to the received command signal CMD to control the rotational speed of the motor module 120. Generation of the command signal CMD is described in detail hereinafter.

Figure 5:
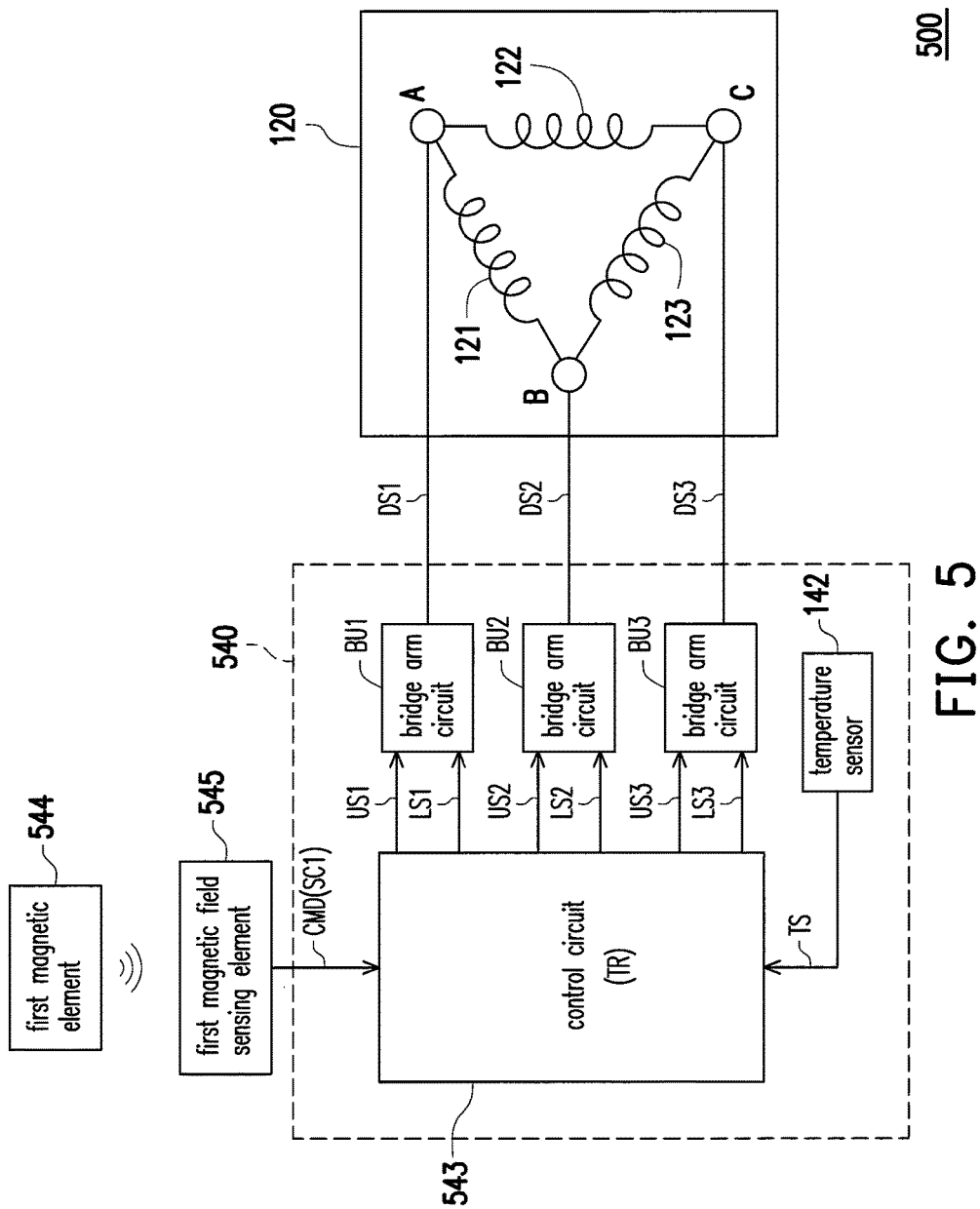
FIG. 5 is a circuit block diagram of the motor apparatus according to another embodiment of the invention.

Hereinafter, referring to FIG. 5, FIG. 5 is a circuit block diagram of a motor apparatus 500 according to another embodiment of the invention. The motor apparatus 500 may include the motor module 120, a motor driving circuit 540, a first magnetic element 544, and a first magnetic field sensing element 545. The motor driving circuit 540 may include the bridge arm circuits BU1, BU2, and BU3, the temperature sensor 142, and a control circuit 543, but the invention is not limited thereto. In an embodiment of the invention, the first magnetic element 544 and the first magnetic field sensing element 545 may be integrated as a part of the motor driving circuit 540. The motor module 120, the temperature sensor 142, the control circuit 543, and the bridge arm circuits BU1, BU2, and BU3 of FIG. 5 are respectively similar to the motor module 120, the temperature sensor 142, the control circuit 143, and the bridge arm circuits BU1, BU2, and BU3 of FIG. 1 and may be implemented with reference to the descriptions of FIG. 1 through FIG. 4 and thus are not repeated hereinafter. The first magnetic element 544 and the first magnetic field sensing element 545 are described in detail hereinafter.

The first magnetic element 544 is configured to generate a first magnetic field. The first magnetic field sensing element 545 is coupled to the control circuit 543. When the first magnetic element 544 is moved close to or away from the first magnetic field sensing element 545, the first magnetic field sensing element 545 may sense change of the intensity of the first magnetic field to generate a first sensing signal SC1. Then, the control circuit 543 takes the first sensing signal SC1 as the command signal CMD and adjusts the rotational speed of the motor module 120 correspondingly.

More specifically, the user may move the first magnetic element 544 to control a distance between the first magnetic element 544 and the first magnetic field sensing element 545. When the first magnetic element 544 is moved close to the first magnetic field sensing element 545, the intensity of the first magnetic field sensed by the first magnetic field sensing element 545 increases. Therefore, the first magnetic field sensing element 545 may generate the corresponding first sensing signal SC1 to serve as the command signal CMD, such that the control circuit 543 increases the rotational speed of the motor module 120 according to the command signal CMD. On the other hand, when the first magnetic element 544 is moved away from the first magnetic field sensing element 545, the intensity of the first magnetic field sensed by the first magnetic field sensing element 545 decreases. Therefore, the first magnetic field sensing element 545 may generate the corresponding first sensing signal SC1 to serve as the command signal CMD, such that the control circuit 543 reduces the rotational speed of the motor module 120 according to the command signal CMD.

In an embodiment of the invention, the first magnetic element 544 may be implemented by using a permanent magnet, and the first magnetic field sensing element 545 may be implemented by using a Hall sensing integrated circuit, but the invention is not limited thereto.

Figure 6:
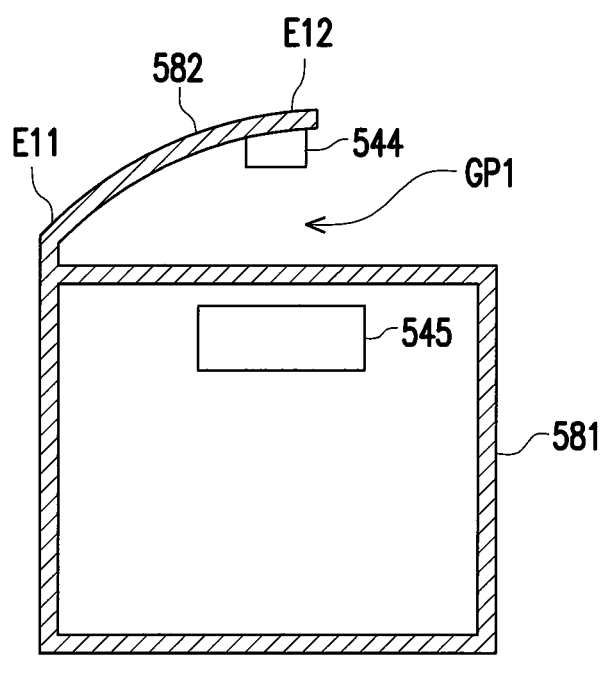
FIG. 6 is a diagram showing the structure of the motor apparatus of FIG. 5 according to an embodiment of the invention.

In an embodiment of the invention, as shown in FIG. 6, the motor apparatus 500 may further include a waterproof case 581 and a first elastic pressing piece 582, wherein the stator coils 121, 122, and 123, the bridge arm circuits BU1, BU2, and BU3, the temperature sensor 142, the control circuit 543, and the first magnetic field sensing element 545 of the motor module 120 of FIG. 5 may be disposed inside the waterproof case 581. To simplify the illustration, only the first magnetic field sensing element 545 is depicted inside the waterproof case 581 of FIG. 6. The first elastic pressing piece 582 is disposed outside the waterproof case 581, wherein a first end E11 of the first elastic pressing piece 582 is connected to the waterproof case 581, and a second end E12 of the first elastic pressing piece 582 is separated from the waterproof case 581 by a first gap GP1. The second end E12 of the first elastic pressing piece 582 may be elastically pressed to be close to the waterproof case 581. The second end E12 of the first elastic pressing piece 582 may return to the original position after being released from a pressing force. The first magnetic element 544 is disposed at the second end E12 of the first elastic pressing piece 582, and the first magnetic element 544 and the first magnetic field sensing element 545 are opposite to each other. It can be understood that the user may press the second end of the first elastic pressing piece 582 to bring the first magnetic element 544 close to the first magnetic field sensing element 545 in the waterproof case 581; or during the pressing, release the second end E12 of the first elastic pressing piece 582 for the first magnetic element 544 to move away from the first magnetic field sensing element 545 in the waterproof case 581 and return to the original position.

Because a non-contact type magnetic force sensing switch (i.e., the first magnetic element 544 and the first magnetic field sensing element 545) is used as a speed adjustment switch of the motor apparatus 500 in this embodiment, when the motor apparatus 500 vibrates due to operation, the non-contact type magnetic force sensing switch does not cause a spark due to the vibration and therefore the motor apparatus 500 has a longer service life than a general motor apparatus with a contact type switch. Furthermore, the motor apparatus 500 of this embodiment has excellent waterproof and dustproof functions and is able to function normally in various environments (e.g., underwater).

Figure 7:
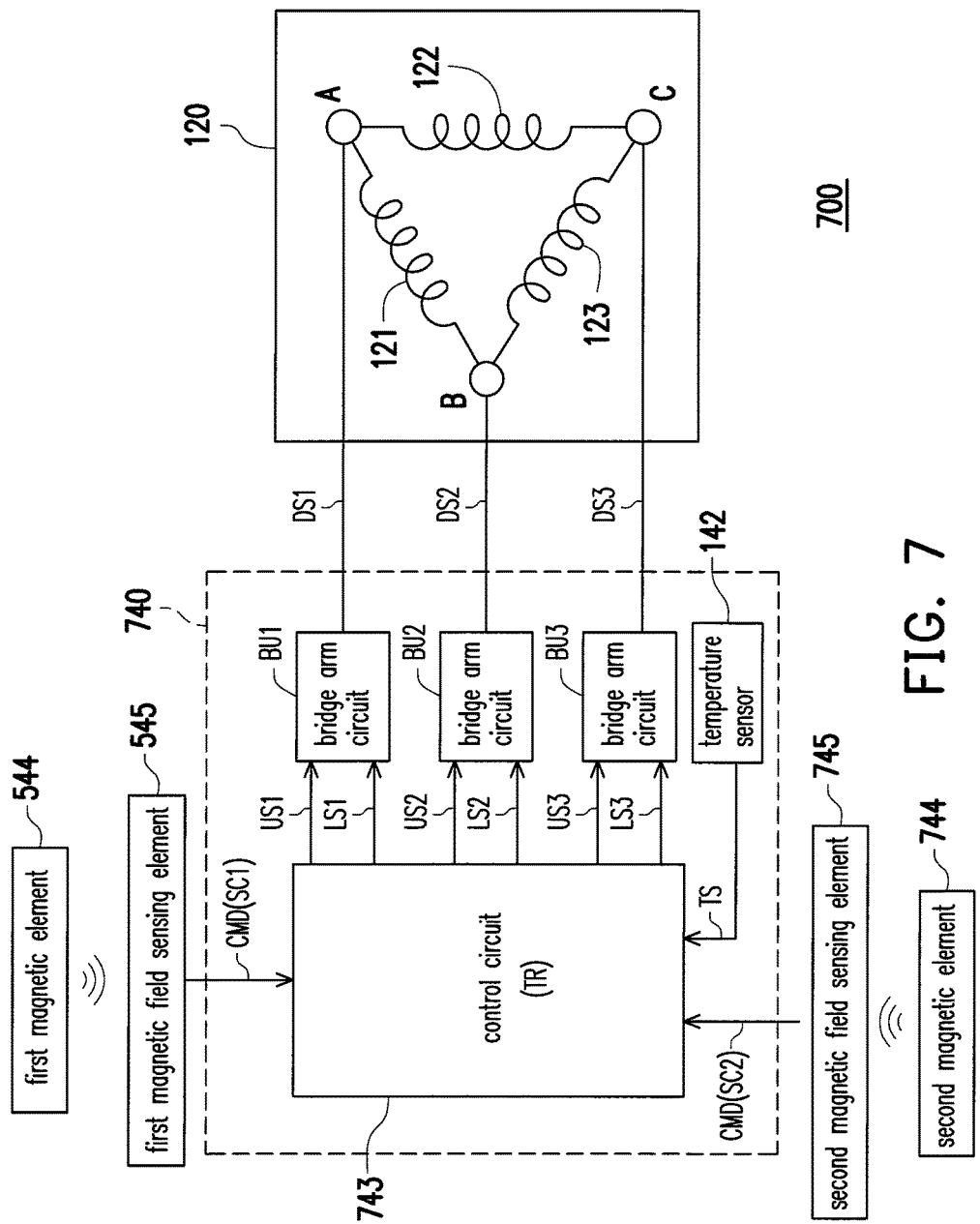
FIG. 7 is a circuit block diagram of the motor apparatus according to yet another embodiment of the invention.

Hereinafter, referring to FIG. 7, FIG. 7 is a circuit block diagram of a motor apparatus 700 according to yet another embodiment of the invention. The motor apparatus 700 may include the motor module 120, a motor driving circuit 740, the first magnetic element 544, the first magnetic field sensing element 545, a second magnetic element 744, and a second magnetic field sensing element 745. The motor driving circuit 740 may include the bridge arm circuits BU1, BU2, and BU3, the temperature sensor 142, and a control circuit 743, but the invention is not limited thereto. In an embodiment of the invention, the first magnetic element 544, the first magnetic field sensing element 545, the second magnetic element 744, and the second magnetic field sensing element 745 may be integrated as a part of the motor driving circuit 740. The motor module 120, the temperature sensor 142, the control circuit 743, and the bridge arm circuits BU1, BU2, and BU3 of FIG. 7 are respectively similar to the motor module 120, the temperature sensor 142, the control circuit 143, and the bridge arm circuits BU1, BU2, and BU3 of FIG. 1 and are as described above with reference to FIG. 1 through FIG. 4, and thus are not repeated hereinafter. In addition, the first magnetic element 544 and the first magnetic field sensing element 545 of FIG. 7 are respectively similar to the first magnetic element 544 and the first magnetic field sensing element 545 of FIG. 5 and are as described above with reference to FIG. 5 and FIG. 6, and thus are not repeated hereinafter. The second magnetic element 744 and the second magnetic field sensing element 745 are described in detail hereinafter.

The second magnetic element 744 is configured to generate a second magnetic field. The second magnetic field sensing element 745 is coupled to the control circuit 743. When the second magnetic element 744 is moved close to the second magnetic field sensing element 745, the second magnetic field sensing element 745 may sense the second magnetic field to generate a second sensing signal SC2. The control circuit 743 may determine whether the second magnetic element 744 is moved according to the second sensing signal SC2. When the control circuit 743 detects that the second magnetic element 744 is moved according to the second sensing signal SC2, the control circuit 743 may control a current rotational speed range of the motor module 120 to switch from one set rotational speed range to another set rotational speed range.

More specifically, the control circuit 743 may divide the rotational speed range of the motor module 120 into a plurality of set rotational speed ranges. For example, it is assumed that the rotational speed range of the motor module 120 is from 0 RPM to 10000 RPM, and the control circuit 743 divides the rotational speed range of the motor module 120 into three set rotational speed ranges (but not limited thereto), wherein the first set rotational speed range is from 0 RPM to 4000 RPM, the second set rotational speed range is from 4000 RPM to 7000 RPM, and the third set rotational speed range is from 7000 RPM to 10000 RPM, for example, and the current rotational speed range of the motor module 120 is set to the second set rotational speed range (i.e., the current rotational speed of the motor module 120 is between 4000 RPM and 7000 RPM). At this time, the user may move the second magnetic element 744 to bring the second magnetic element 744 close to the second magnetic field sensing element 745. The second magnetic field sensing element 744 may sense the second magnetic field generated by the second magnetic element 744 as the second magnetic element 744 approaches, and generates the second sensing signal SC2 accordingly. When the control circuit 743 detects that the second magnetic element 744 is moved according to the second sensing signal SC2, the control circuit 743 may switch the current rotational speed range of the motor module 120 from the second set rotational speed range (from 4000 RPM to 7000 RPM) to the third set rotational speed range (from 7000 RPM to 10000 RPM) to raise the rotational speed of the motor module 120 to the third set rotational speed range; or the control circuit 743 may switch the current rotational speed range of the motor module 120 from the second set rotational speed range (from 4000 RPM to 7000 RPM) to the first set rotational speed range (from 0 RPM to 4000 RPM) to reduce the rotational speed of the motor module 120 to the first set rotational speed range.

In the embodiment described above, the control circuit 743 may further adjust the rotational speed of the motor module 120 within the current rotational speed range of the motor module 120 according to the first sensing signal SC1. For example, if the current rotational speed range of the motor module 120 is set to the second set rotational speed range (from 4000 RPM to 7000 RPM), the user may move the first magnetic element 544 to control the distance between the first magnetic element 544 and the first magnetic field sensing element 545 for the first magnetic field sensing element 545 to generate the corresponding first sensing signal SC1 as the command signal CMD, such that the control circuit 743 may adjust the rotational speed of the motor module 120 within the second set rotational speed range according to the command signal CMD.

In an embodiment of the invention, the second magnetic element 744 may be implemented by using a permanent magnet, and the second magnetic field sensing element 745 may be implemented by using a Hall sensing integrated circuit, but the invention is not limited thereto.

Figure 8:
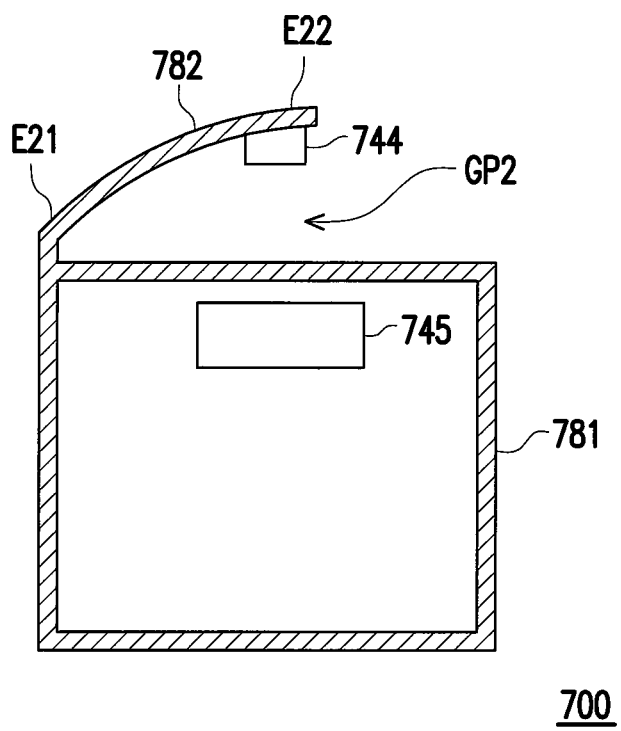
FIG. 8 is a diagram showing the structure of the motor apparatus of FIG. 7 according to an embodiment of the invention.

In an embodiment of the invention, as shown in FIG. 8, the motor apparatus 700 may further include a waterproof case 781, a first elastic pressing piece (not shown), and a second elastic pressing piece 782, wherein the stator coils 121, 122, and 123, the bridge arm circuits BU1, BU2, and BU3, the temperature sensor 142, the control circuit 743, the first magnetic field sensing element 545, and the second magnetic field sensing element 745 of the motor module 120 of FIG. 7 may be disposed inside the waterproof case 781. To simplify the illustration, only the second magnetic field sensing element 745 is depicted in the waterproof case 781 of FIG. 8. In addition, the first elastic pressing piece, the first magnetic element 544, the first magnetic field sensing element 545, and the waterproof case 781 of this embodiment are configured in a manner similar to that of the first elastic pressing piece 582, the first magnetic element 544, the first magnetic field sensing element 545, and the waterproof case 581 of FIG. 5 and FIG. 6 and are as described above with reference to FIG. 5 and FIG. 6, and thus are not repeated hereinafter.

The second elastic pressing piece 782 is disposed outside the waterproof case 781, wherein a first end E21 of the second elastic pressing piece 782 is connected to the waterproof case 781, and a second end E22 of the second elastic pressing piece 782 is separated from the waterproof case 781 by a second gap GP2. The second end E22 of the second elastic pressing piece 782 may be elastically pressed to be close to the waterproof case 781. The second end E22 of the second elastic pressing piece 782 may return to the original position after being released from a pressing force. The second magnetic element 744 is disposed at the second end E22 of the second elastic pressing piece 782, and the second magnetic element 744 and the second magnetic field sensing element 745 are opposite to each other. It can be understood that the user may press the second end E22 of the second elastic pressing piece 782 to bring the second magnetic element 744 close to the second magnetic field sensing element 745 in the waterproof case 781; or during the pressing, release the second end E22 of the second elastic pressing piece 782 for the second magnetic element 744 to move away from the second magnetic field sensing element 745 in the waterproof case 781 and return to the original position.

Because a non-contact type magnetic force sensing switch (i.e., the first magnetic element 544, the first magnetic field sensing element 545, the second magnetic element 744, and the second magnetic field sensing element 745) is used as a speed adjustment switch of the motor apparatus 700 in this embodiment, when the motor apparatus 700 vibrates due to operation, the non-contact type magnetic force sensing switch does not cause a spark due to the vibration and therefore the motor apparatus 700 has a longer service life than a general motor apparatus with a contact type switch. Furthermore, the motor apparatus 700 of this embodiment has excellent waterproof and dustproof functions and is able to function normally in various environments (e.g., underwater).

Figure 9:
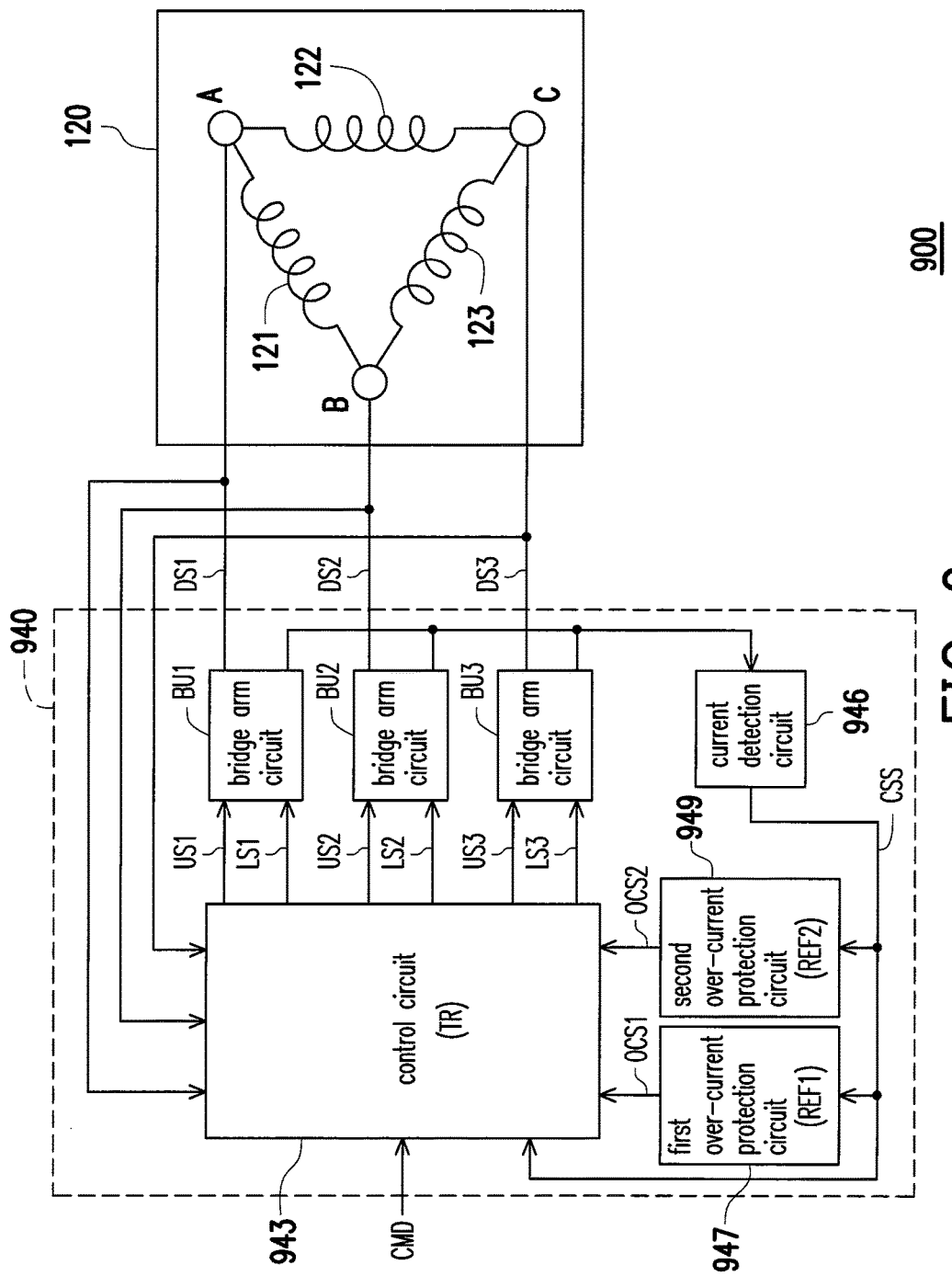
FIG. 9 is a circuit block diagram of the motor apparatus according to yet another embodiment of the invention.

Hereinafter, referring to FIG. 9, FIG. 9 is a circuit block diagram of a motor apparatus 900 according to yet another embodiment of the invention. The motor apparatus 900 may include the motor module 120 and a motor driving circuit 940. The motor driving circuit 940 may include the bridge arm circuits BU1, BU2, and BU3, a control circuit 943, a current detection circuit 946, a first over-current protection circuit 947, and a second over-current protection circuit 949, but the invention is not limited thereto. The motor module 120, the control circuit 943, and the bridge arm circuits BU1, BU2, and BU3 of this embodiment are respectively similar to the motor module 120, the control circuit 143, and the bridge arm circuits BU1, BU2, and BU3 of FIG. 1 and are as described above with reference to FIG. 1 through FIG. 4, and thus are not repeated hereinafter. The current detection circuit 946, the first over-current protection circuit 947, and the second over-current protection circuit 949 are described in detail hereinafter.

Figure 10:
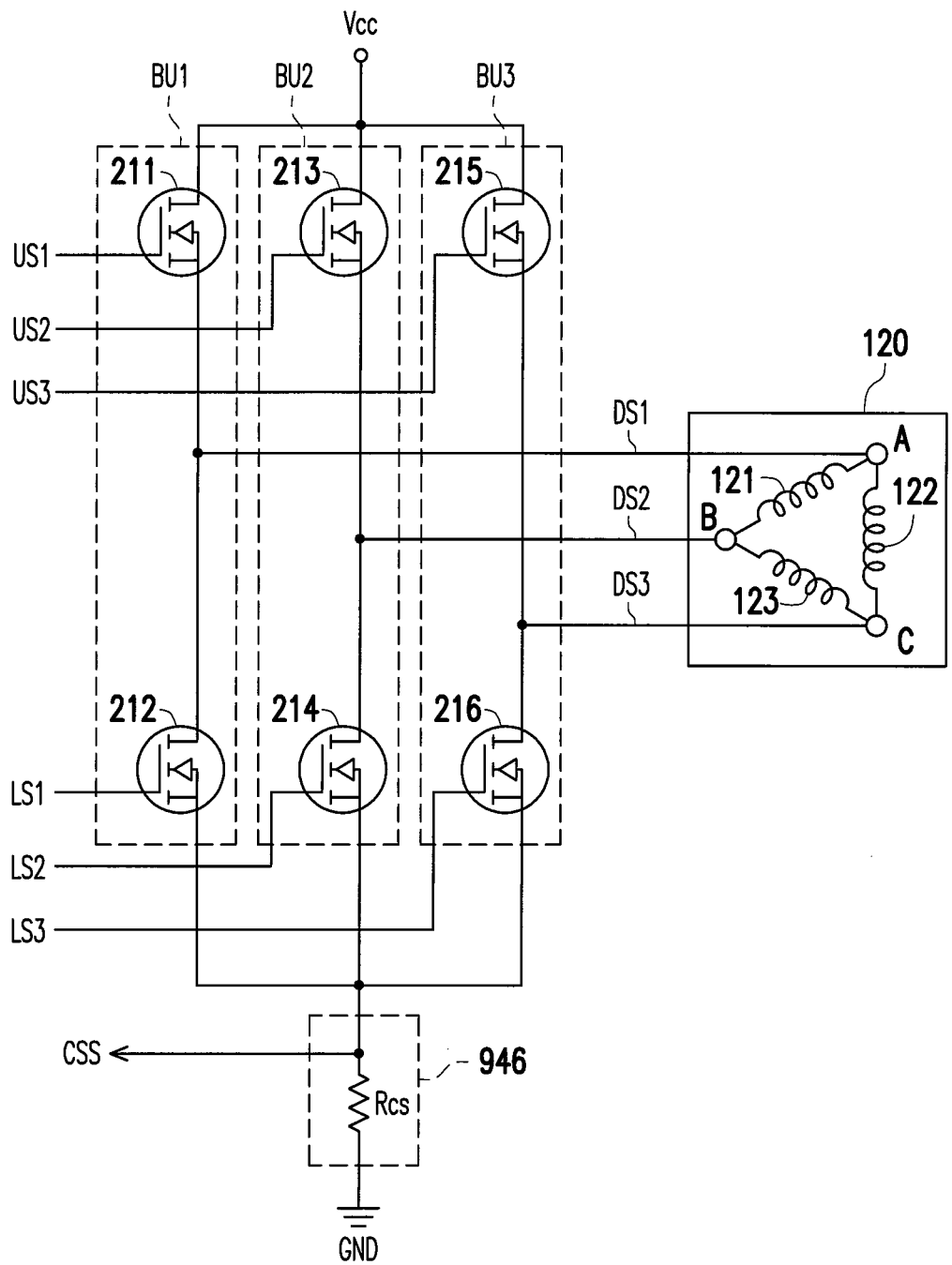
FIG. 10 is a diagram showing circuit configurations of the bridge arm circuits and the current detection circuit according to an embodiment of the invention.

Hereinafter, referring to FIG. 9 and FIG. 10, FIG. 10 is a diagram showing circuit configurations of the bridge arm circuits BU1, BU2, and BU3 and the current detection circuit 946 according to an embodiment of the invention. The current detection circuit 946 is coupled to the bridge arm circuits BU1, BU2, and BU3 to detect a current value of the motor module 120 and generate a current sensing signal CSS accordingly. More specifically, the current detection circuit 946 may include a sensing resistor Rcs, wherein the first end of the sensing resistor Rcs is coupled to the ground end GND and the second end of the sensing resistor Rcs is coupled to the source ends of the lower arm transistors 212, 214, and 216 and generates the current sensing signal CSS.

The first over-current protection circuit 947 is coupled to the current detection circuit 946 to receive the current sensing signal CSS and compares the current value of the motor module 120 indicated by the current sensing signal CSS with a first reference value REF1, so as to generate a first over-current protection signal OCS1. The second over-current protection circuit 949 is coupled to the current detection circuit 946 to receive the current sensing signal CSS and compares the current value of the motor module 120 indicated by the current sensing signal CSS with a second reference value REF2, so as to generate a second over-current protection signal OCS2, wherein the second reference value REF2 is smaller than the first reference value REF1.

The control circuit 943 is further coupled to the first over-current protection circuit 947 and the second over-current protection circuit 949 to receive the first over-current protection signal OCS1 and the second over-current protection signal OCS2 respectively. In particular, the control circuit 943 performs an over-current protection on the motor module 120 according to the first over-current protection signal OCS1 in a start-up stage of the motor module 120, and the control circuit 943 performs the over-current protection on the motor module 120 according to the second over-current protection signal OCS2 when the start-up stage of the motor module 120 has been completed.

More specifically, the motor module 120 requires a larger current at the time of start-up. Therefore, the motor driving circuit 940 of this embodiment performs the over-current protection with the larger first reference value REF1 (compared to the second reference value REF2) in the start-up stage of the motor module 120, so as to avoid frequently triggering the over-current protection mechanism during start-up of the motor module 120 (which results in longer time for start-up of the motor module 120) for the motor module 120 to complete start-up quickly. Further, in the normal operation stage after the motor module 120 has completed the start-up, the motor driving circuit 940 of this embodiment performs the over-current protection with the smaller second reference value REF2 (compared to the first reference value REF1), so as to prevent the motor module 120 from being damaged by an excessive current during the normal operation.

In an embodiment of the invention, in the start-up stage of the motor module 120, in order to prevent an excessive instantaneous current of the motor module 120 from frequently triggering the over-current protection mechanism, the control circuit 943 may first control the motor module 120 to operate one round (or at least one round) at the first rotational speed (low speed), and then control the motor module 120 to start accelerating from the first rotational speed. As a result, the current value of the motor module 120 is suppressed from exceeding the first reference value REF1 to trigger the over-current protection mechanism. Further, when the rotational speed of the motor module 120 is raised to the second rotational speed, the control circuit 943 may determine that the motor module 120 has completed the start-up stage and entered the normal operation stage.

Generally speaking, the motor module 120 has a larger current and a lower rotational speed in the start-up stage, and has a smaller current and a higher rotational speed in the normal operation stage. Thus, in an embodiment of the invention, the control circuit 943 may detect the current or the rotational speed of the motor module 120 and determine whether the motor module 120 has completed the start-up according to the detected current or rotational speed. In other words, the control circuit 943 may determine whether the motor module 120 is in the start-up stage or the normal operation stage based on the detected current or rotational speed. If the control circuit 943 determines that the motor module 120 is in the start-up stage, the control circuit 943 performs the over-current protection on the motor module 120 with the first over-current protection signal OCS1. On the other hand, if the control circuit 943 determines that the motor module 120 is in the normal operation stage, the control circuit 943 performs the over-current protection on the motor module 120 with the second over-current protection signal OCS2.

In an embodiment of the invention, the control circuit 943 may be coupled to the current detection circuit 946 to receive the current sensing signal CSS, so as to detect the current of the motor module 120. In another embodiment of the invention, the control circuit 943 may be coupled to the motor module 120 to detect the back electromotive forces of the phase nodes A, B, and C, and detect the rotational speed of the motor module 120 according to the back electromotive forces of the phase nodes A, B, and C. A method of detecting the rotational speed of the motor module 120 according to the back electromotive forces of the phase nodes A, B, and C is commonly known to those skilled in the art and thus is not described in detail hereinafter. In an embodiment of the invention, the first over-current protection circuit 947 and the second over-current protection circuit 949 may be implemented by using an operational amplifier or a comparator, but the invention is not limited thereto.

To sum up, in the motor apparatus and the motor driving circuit disclosed in the embodiments of the invention, the operating speed of the motor module is increased when the temperature of the bridge arm circuits is greater than or equal to the threshold temperature value, so as to reduce the number of times of turning on and off the transistors in the bridge arm circuits to reduce switching power loss of the transistors and thereby lower the temperature of the bridge arm circuits. Furthermore, the motor apparatus and the motor driving circuit disclosed in the embodiments of the invention use a non-contact type magnetic force sensing switch as the speed adjustment switch of the motor apparatus. Thus, when the motor apparatus vibrates due to operation, the non-contact type magnetic force sensing switch does not cause a spark due to the vibration, and therefore the motor apparatus has a longer service life and better waterproof and dustproof functions than a general motor apparatus with a contact type switch. Besides, the motor driving circuit performs the over-current protection with the larger first reference value in the start-up stage of the motor module, so as to avoid frequently triggering the over-current protection mechanism during start-up of the motor module, which results in longer time for start-up of the motor module. On the other hand, in the normal operation stage after the motor module has completed the start-up, the motor driving circuit performs the over-current protection with the smaller second reference value, so as to prevent the motor module from being damaged by an excessive current during the normal operation.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A motor apparatus, comprising:
a motor module comprising a plurality of stator coils; and
a motor driving circuit comprising:
  a plurality of bridge arm circuits coupled to the stator coils to sequentially drive the motor module, wherein each of the bridge arm circuits receives a first pulse width modulation signal and a second pulse width modulation signal and is controlled by the first pulse width modulation signal and the second pulse width modulation signal to output a driving signal to drive the motor module;
  a temperature sensor configured to sense a temperature of the bridge arm circuits and generate a temperature sensing value accordingly; and
  a control circuit coupled to the bridge arm circuits to generate the first pulse width modulation signal and the second pulse width modulation signal for each of the bridge arm circuits,
  wherein the control circuit is further coupled to the temperature sensor to receive the temperature sensing value and compares the temperature sensing value with a threshold temperature value, and when the control circuit determines that the temperature sensing value is greater than or equal to the threshold temperature value, the control circuit increases a duty cycle of the first pulse width modulation signal of a driving bridge arm circuit among the bridge arm circuits to reduce the number of times of transition of the first pulse width modulation signal of the driving bridge arm circuit, and the control circuit increases a duty cycle of the second pulse width modulation signal of other bridge arm circuits among the bridge arm circuits to reduce the number of times of transition of the second pulse width modulation signal of the other bridge arm circuits, so as to lower the temperature of the bridge arm circuits.

2. The motor apparatus according to claim 1, wherein when the control circuit determines that the temperature sensing value is greater than or equal to the threshold temperature value, the driving bridge arm circuit generates the corresponding driving signal in response to increase of the duty cycle of the first pulse width modulation signal of the driving bridge arm circuit and increase of the duty cycle of the second pulse width modulation signal of the other bridge arm circuits, so as to increase a rotational speed of the motor module.

3. The motor apparatus according to claim 2, wherein when the control circuit determines that the temperature sensing value is greater than or equal to the threshold temperature value, the control circuit increases the duty cycle of the first pulse width modulation signal of the driving bridge arm circuit to 100% and increases the duty cycle of the second pulse width modulation signal of the other bridge arm circuits to 100%, so as to drive the motor module to operate at a maximum rotational speed.

4. The motor apparatus according to claim 1, wherein:
the control circuit is further configured to receive a command signal,
wherein when the control circuit determines that the temperature sensing value is lower than the threshold temperature value, the control circuit generates the first pulse width modulation signal and the second pulse width modulation signal for each of the bridge arm circuits according to the command signal, so as to control a rotational speed of the motor module.

5. The motor apparatus according to claim 1, further comprising:
a first magnetic element configured to generate a first magnetic field; and
a first magnetic field sensing element coupled to the control circuit, wherein when the first magnetic element is moved close to or away from the first magnetic field sensing element, the first magnetic field sensing element senses a change of an intensity of the first magnetic field and generates a first sensing signal accordingly, wherein the control circuit adjusts a rotational speed of the motor module correspondingly according to the first sensing signal.

6. The motor apparatus according to claim 5, further comprising:
a second magnetic element configured to generate a second magnetic field; and
a second magnetic field sensing element coupled to the control circuit, wherein when the second magnetic element is moved close to the second magnetic field sensing element, the second magnetic field sensing element senses the second magnetic field and generates a second sensing signal accordingly,
wherein when the control circuit detects that the second magnetic element is moved according to the second sensing signal, the control circuit controls a current rotational speed range of the motor module to switch from a set rotational speed range to another set rotational speed range.

7. The motor apparatus according to claim 6, wherein the control circuit adjusts the rotational speed of the motor module within the current rotational speed range according to the first sensing signal.

8. The motor apparatus according to claim 6, further comprising:
a waterproof case, wherein the stator coils, the bridge arm circuits, the temperature sensor, the control circuit, the first magnetic field sensing element, and the second magnetic field sensing element of the motor module are disposed inside the waterproof case;
a first elastic pressing piece disposed outside the waterproof case, wherein a first end of the first elastic pressing piece is connected to the waterproof case, and a second end of the first elastic pressing piece is separated from the waterproof case by a first gap and adapted to be elastically pressed to be close to the waterproof case; and
a second elastic pressing piece disposed outside the waterproof case, wherein a first end of the second elastic pressing piece is connected to the waterproof case, and a second end of the second elastic pressing piece is separated from the waterproof case by a second gap and adapted to be elastically pressed to be close to the waterproof case,
wherein the first magnetic element is disposed at the second end of the first elastic pressing piece, and the first magnetic element and the first magnetic field sensing element are opposite to each other,
wherein the second magnetic element is disposed at the second end of the second elastic pressing piece, and the second magnetic element and the second magnetic field sensing element are opposite to each other.

9. The motor apparatus according to claim 1, wherein the motor driving circuit further comprises:
a current detection circuit coupled to the bridge arm circuits and configured to detect a current value of the motor module and generate a current sensing signal accordingly;
a first over-current protection circuit coupled to the current detection circuit to receive the current sensing signal and compare the current value indicated by the current sensing signal with a first reference value, so as to generate a first over-current protection signal; and
a second over-current protection circuit coupled to the current detection circuit to receive the current sensing signal and compare the current value indicated by the current sensing signal with a second reference value, so as to generate a second over-current protection signal, wherein the second reference value is smaller than the first reference value,
wherein the control circuit is further coupled to the first over-current protection circuit and the second over-current protection circuit to receive the first over-current protection signal and the second over-current protection signal respectively, and the control circuit performs an over-current protection on the motor module according to the first over-current protection signal in a start-up stage of the motor module, and the control circuit performs the over-current protection on the motor module according to the second over-current protection signal when the start-up stage of the motor module has been completed.

10. The motor apparatus according to claim 9, wherein:
in the start-up stage of the motor module, the control circuit first controls the motor module to operate at least one round at a first rotational speed, and then controls the motor module to accelerate from the first rotational speed, so as to suppress the current value of the motor module from exceeding the first reference value; and
when a rotational speed of the motor module is raised to a second rotational speed, the motor module completes the start-up stage, wherein the second rotational speed is higher than the first rotational speed.

11. The motor apparatus according to claim 10, wherein the control circuit is further configured to detect a current or the rotational speed of the motor module and determine whether the motor module has completed the start-up stage according to the current or the rotational speed.

12. A motor driving circuit configured to drive a motor module, the motor driving circuit comprising:
a plurality of bridge arm circuits coupled to a plurality of stator coils of the motor module to sequentially drive the motor module, wherein each of the bridge arm circuits receives a first pulse width modulation signal and a second pulse width modulation signal and is controlled by the first pulse width modulation signal and the second pulse width modulation signal to output a driving signal to drive the motor module;
a temperature sensor configured to sense a temperature of the bridge arm circuits and generate a temperature sensing value accordingly; and
a control circuit coupled to the bridge arm circuits to generate the first pulse width modulation signal and the second pulse width modulation signal for each of the bridge arm circuits,
wherein the control circuit is further coupled to the temperature sensor to receive the temperature sensing value and compares the temperature sensing value with a threshold temperature value, and when the control circuit determines that the temperature sensing value is greater than or equal to the threshold temperature value, the control circuit increases a duty cycle of the first pulse width modulation signal of a driving bridge arm circuit among the bridge arm circuits to reduce the number of times of transition of the first pulse width modulation signal of the driving bridge arm circuit, and the control circuit increases a duty cycle of the second pulse width modulation signal of other bridge arm circuits among the bridge arm circuits to reduce the number of times of transition of the second pulse width modulation signal of the other bridge arm circuits, so as to lower the temperature of the bridge arm circuits.

13. The motor driving circuit according to claim 12, further comprising:
- a first magnetic element configured to generate a first magnetic field; and
- a first magnetic field sensing element coupled to the control circuit, wherein when the first magnetic element is moved close to or away from the first magnetic field sensing element, the first magnetic field sensing element senses a change of an intensity of the first magnetic field and generates a first sensing signal accordingly,
- wherein the control circuit adjusts a rotational speed of the motor module correspondingly according to the first sensing signal.

14. The motor driving circuit according to claim 13, further comprising:
- a second magnetic element configured to generate a second magnetic field; and
- a second magnetic field sensing element coupled to the control circuit, wherein when the second magnetic element is moved close to the second magnetic field sensing element, the second magnetic field sensing element senses the second magnetic field and generates a second sensing signal accordingly,
- wherein when the control circuit detects that the second magnetic element is moved according to the second sensing signal, the control circuit controls a current rotational speed range of the motor module to switch from a set rotational speed range to another set rotational speed range.

15. The motor driving circuit according to claim 12, further comprising:
- a current detection circuit coupled to the bridge arm circuits and configured to detect a current value of the motor module and generate a current sensing signal accordingly;
- a first over-current protection circuit coupled to the current detection circuit to receive the current sensing signal and compare the current value indicated by the current sensing signal with a first reference value, so as to generate a first over-current protection signal; and
- a second over-current protection circuit coupled to the current detection circuit to receive the current sensing signal and compare the current value indicated by the current sensing signal with a second reference value, so as to generate a second over-current protection signal, wherein the second reference value is smaller than the first reference value,
- wherein the control circuit is further coupled to the first over-current protection circuit and the second over-current protection circuit to receive the first over-current protection signal and the second over-current protection signal respectively, and the control circuit performs an over-current protection on the motor module according to the first over-current protection signal in a start-up stage of the motor module, and the control circuit performs the over-current protection on the motor module according to the second over-current protection signal when the start-up stage of the motor module has been completed.

* * * * *